United States Patent
Baskerville, Sr.

(10) Patent No.: US 6,957,722 B1
(45) Date of Patent: Oct. 25, 2005

(54) VEHICLE CHOCKING SYSTEM

(76) Inventor: Daniel J. Baskerville, Sr., 3007-B Kentwood St., Greensboro, NC (US) 27405

( * ) Notice: Subject to any disclaimer, the term of this patent is extended or adjusted under 35 U.S.C. 154(b) by 0 days.

(21) Appl. No.: 10/803,355

(22) Filed: Mar. 19, 2004

(51) Int. Cl.$^7$ ................................................ B60T 3/00
(52) U.S. Cl. .......................... 188/32; 188/4 R; 188/5; 188/36
(58) Field of Search .................. 188/36, 4 R, 4 B, 188/5, 32; D12/217; 293/7; 410/30; 180/16; 104/257

(56) References Cited

U.S. PATENT DOCUMENTS

| | | | |
|---|---|---|---|
| 2,710,074 A | * | 6/1955 | Simpson ........................ 188/5 |
| 2,823,769 A | * | 2/1958 | Gamble ...................... 188/2 R |
| 3,086,619 A | | 4/1963 | Grotz |
| 3,176,785 A | * | 4/1965 | Lukawsky ................... 180/15 |
| 3,176,798 A | * | 4/1965 | Nesselberger .............. 188/4 R |
| 3,517,776 A | * | 6/1970 | San Martino et al. ...... 188/4 R |
| 3,722,631 A | * | 3/1973 | Lowrie ........................ 188/4 R |
| 4,186,823 A | * | 2/1980 | White, Jr. .................... 188/32 |
| 4,325,465 A | * | 4/1982 | Lemon ........................ 188/4 R |
| 4,354,580 A | * | 10/1982 | Delasantos et al. ......... 188/4 R |
| 4,569,422 A | | 2/1986 | Hoffman |
| 5,439,076 A | * | 8/1995 | Percy, Jr. .................... 188/4 R |
| 5,497,857 A | | 3/1996 | Warren et al. |
| 5,601,158 A | * | 2/1997 | Klusmeyer et al. .......... 188/31 |
| 5,901,816 A | | 5/1999 | Camilleri |
| 5,967,575 A | * | 10/1999 | Blake ........................ 294/19.1 |
| 6,378,956 B1 | | 4/2002 | Van De Walker |
| 6,401,876 B1 | * | 6/2002 | Boros ............................. 188/5 |

* cited by examiner

*Primary Examiner*—Matthew C. Graham
*Assistant Examiner*—Mariano Sy

(57) ABSTRACT

A vehicle chocking system includes a control panel positionable within a vehicle for remotely operating the system. The system further includes a housing and a power source for supplying power to the system. The housing includes a motor disposed therein and electrically connected to the control panel. The system further includes a chock arm pivotally connected to the motor and a tire chock connected to the chock arm and engageable with a vehicle tire for preventing same from rotating in a predetermined direction. The chock arm includes an elongated pin connected thereto and extending outwardly therefrom. The tire chock has a slot formed therein for receiving the pin so that the tire chock can be engaged with, and disengaged from, a vehicle tire. The system further includes a plurality of collars securable to each other and engageable about a vehicle axle for assisting to maintain same at a non-rotating position.

7 Claims, 4 Drawing Sheets

VEHICLE CHOCKING SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to vehicular chocking devices and, more particularly, to a chocking system mounted on the underside of a vehicle to provide a means of chocking the vehicle wherever it is parked.

2. Prior Art

Modern vehicles are normally supplied with braking systems that function to maintain the vehicle in a fixed position. Such systems usually operate on the wheels of the vehicle and are intended to prevent the wheels from rotating.

In addition to the braking system, many vehicles, and particularly cargo vehicles such as trailers of a tractor-trailer combination, are provided with wedge shaped chocks that are manually placed in front or behind the wheel of the vehicle when it is parked. While the use of such a chock serves the function of preventing the run away of a vehicle, chocks are not always available when the vehicle is parked.

Such chocking systems are only as effective as the engagement between the chock and the vehicle wheel. Separate wheel chocks are normally placed at the wheel by the vehicle operator. The chock is hand wedged against the wheel and road surface. However, if the vehicle moves, the wedge may also move and thus, fail in its function. To overcome this disadvantage, a chocking system should be mounted on the vehicle so as to move with the vehicle.

In addition, such a chocking system should provide a positive and continuous force between the vehicle frame and the vehicle wheel to provide a more secure chocking of the vehicle wheel. The chocking system should further collapse the entire assembly into a compact protected position parallel to the underside of the vehicle and provide a method of engaging/disengaging same from within the cab of a vehicle.

Accordingly, a need remains for a chocking system that includes the above-mentioned features.

BRIEF SUMMARY OF THE INVENTION

In view of the foregoing background, it is therefore an object of the present invention to provide a device for chocking the tires of a vehicle. These and other objects, features, and advantages of the invention are provided by a vehicle chocking system including a control panel positionable within a vehicle for remotely operating the chocking system. The system further includes a housing having front and rear portions with a plurality of slots formed thereat respectively, and a power source for supplying power to the system. The housing further includes a motor disposed therein and electrically connected to the control panel. The motor includes a threaded shaft selectively movable between retracted and expanded positions.

The system further includes a chock arm having top and bottom end portions with the top end portion pivotally connected to the motor. The chock arm is movable between operating and non-operating positions as the threaded shaft is expanded and retracted respectively.

The system further includes a tire chock connected to the chock arm and engageable with a vehicle tire for preventing same from rotating in a predetermined direction. The tire chock may include a serrated surface engageable with a vehicle tire for maintaining surface contact therewith. Such a tire chock has a longitudinal length extending substantially across a width of a vehicle tire. The chock arm further includes an elongated pin connected thereto and extending outwardly therefrom. The tire chock has a slot formed therein for receiving the pin so that the tire chock can be engaged with, and disengaged from, a vehicle tire. The chock arm is formed to be non-linear so that the chock arm will extend outwardly and downwardly from the housing. The tire chock further has a bottom surface and includes a rubber pad attached thereto for providing resistive force against a ground surface.

The system further includes a plurality of collars securable to each other and having an arcuate portion formed substantially medially thereof respectively. The plurality of collars are engageable about a vehicle axle for assisting to maintain same at a non-rotating position, with one such collar being securable to the housing.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
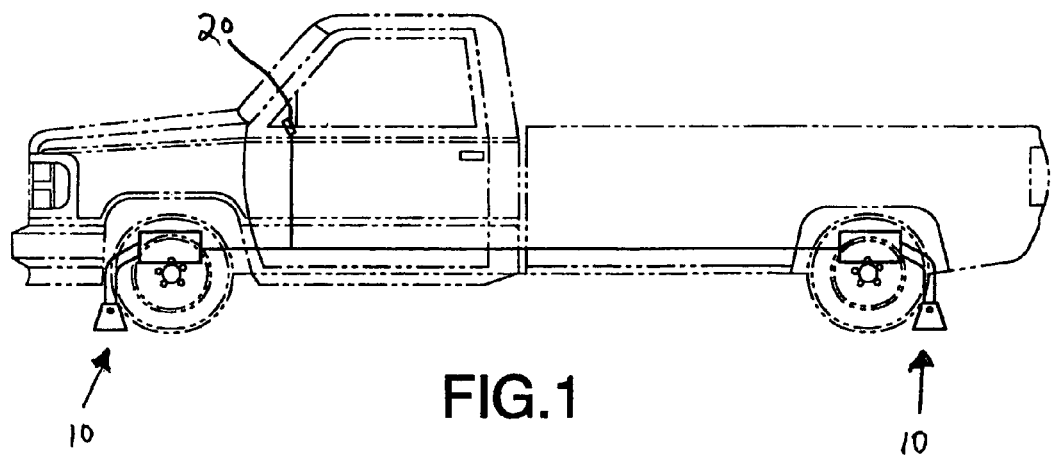
FIG. 1 is a side elevational view showing a vehicle chocking system in a preferred environment, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1–4 by the reference numeral 10 and is intended to provide a system for chocking the wheels of a vehicle. It should be understood that the chocking system 10 may be used to chock the wheels of many different vehicles and should not be limited to only cars and light trucks.

Figure 2:
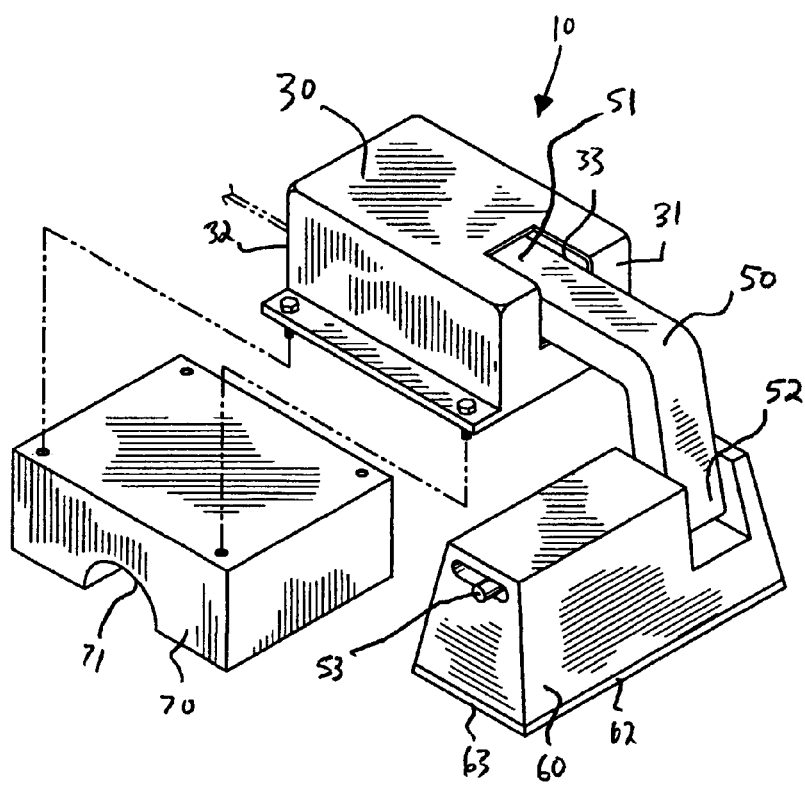
FIG. 2 is a partial perspective view of the present invention.

Initially referring to FIGS. 1 and 2, the chocking system 10 includes a control panel 20 positionable within a vehicle for remotely operating the chocking system 10. The control panel 20 is preferably mounted on the dashboard of a vehicle, or other convenient location, so that the vehicle's operator can easily activate the chocking system 10. The chocking system 10 further includes a housing 30 having front 31 and rear portions 32 with a plurality of slots 33 formed thereat respectively, and a power source (not shown) for supplying power to the chocking system 10. The vehicle's 12-volt battery system preferably serves as the power source, but a power source independent of the vehicle's system may be provided.

Figure 3:
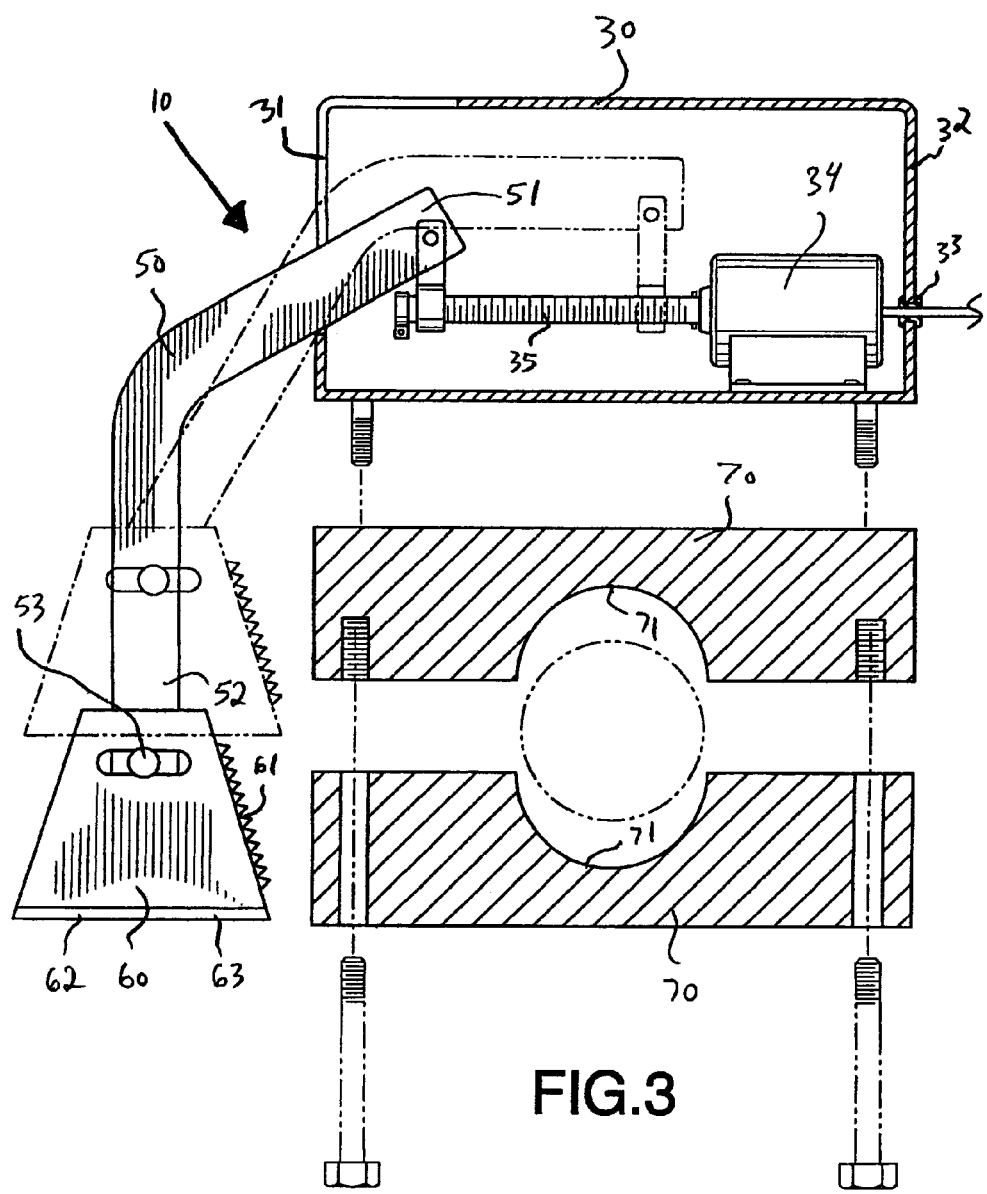
FIG. 3 is a cross-sectional view of the present invention showing the chock arm movable between non-operating and operating positions.

Now referring to FIG. 3, the housing 30 further includes a motor 34 disposed therein and electrically connected to the control panel 20. The housing 30 shields and protects the motor from the dirt, gravel and road salt frequently encountered by the underside of vehicles during operating conditions. The motor 34 includes a threaded shaft 35 selectively movable between retracted and expanded positions when a driver activates the chocking system 10 via the control panel 20. The motor 34 is a conventional electric motor, as well known in the industry, with the threaded shaft 34 serving as its output shaft.

The chocking system 10 further includes a chock arm 50 having top 51 and bottom 52 end portions with the top end portion 51 pivotally connected to the motor 34. The chock arm 50 is movable between operating and non-operating positions as the threaded shaft 35 is expanded and retracted respectively.

Figure 4A:
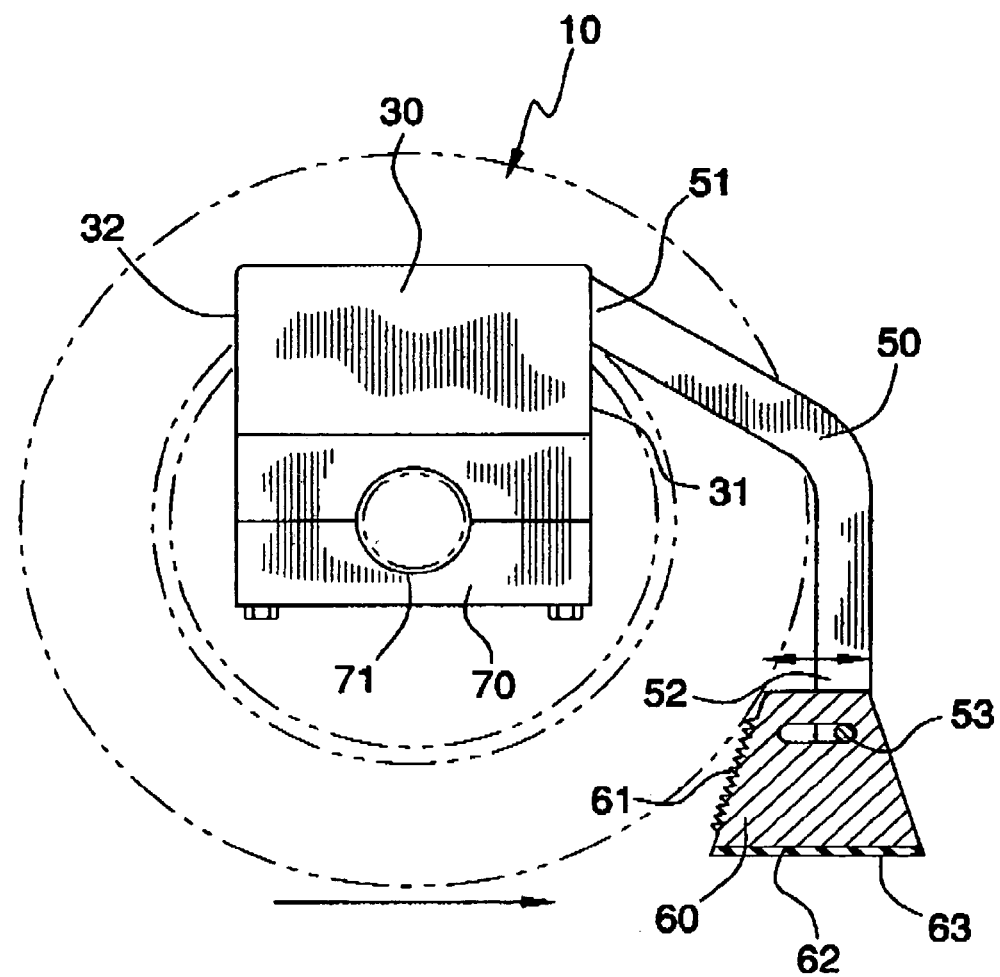
FIG. 4A is a side elevational view of the present invention showing the tire chock disengaged from a vehicle tire.
Figure 4B:
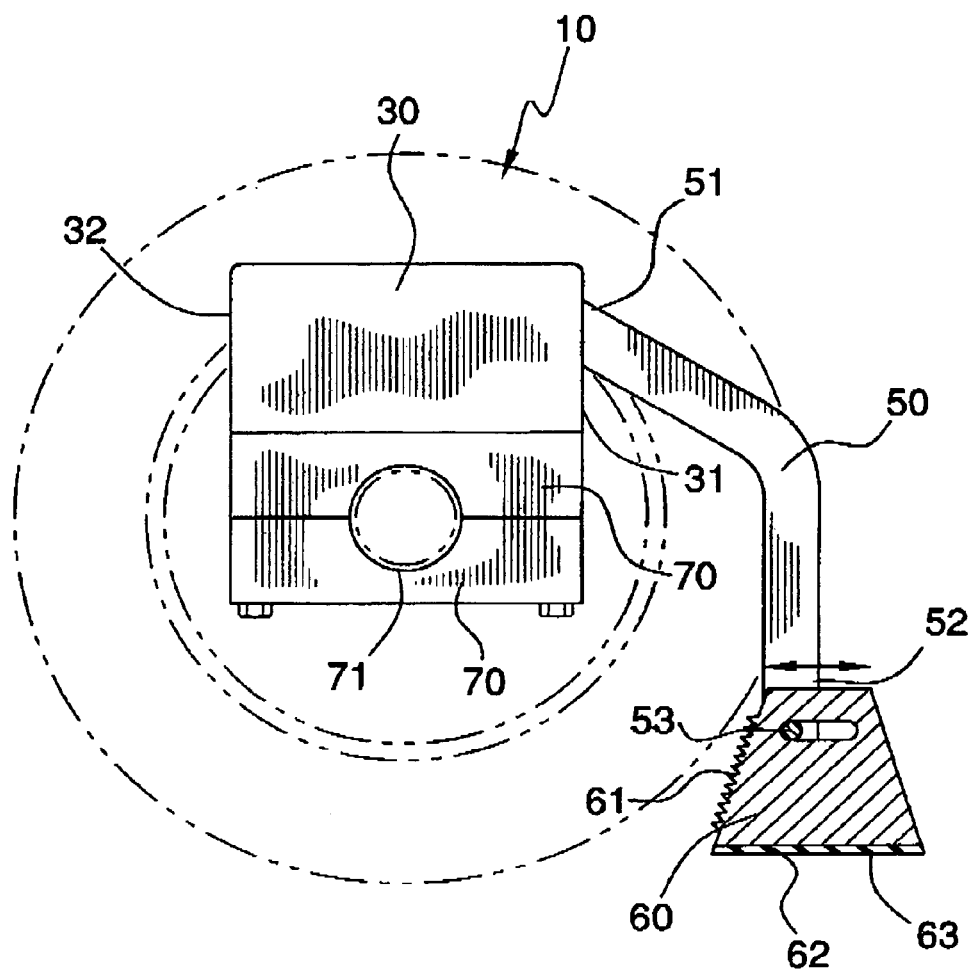
FIG. 4B is a side elevational view of the present invention showing engaged with a vehicle tire.

Now referring to FIGS. 4A and 4B, the chocking system 10 further includes a tire chock 60 connected to the chock arm 50 and engageable with a vehicle tire for preventing same from rotating in a predetermined direction. The tire chock 60 further includes a serrated surface 61 engageable with a vehicle tire for maintaining surface contact therewith, as best shown in FIG. 4B. Such a tire chock 60 has a longitudinal length extending substantially across at least a width of a vehicle tire, as best shown in FIG. 2. The chock arm 50 further includes an elongated pin 53 connected thereto and extending outwardly therefrom. The tire chock 60 has a slot 61 formed therein for receiving the pin 53 so that the tire chock 60 can be engaged with, and disengaged from, a vehicle tire.

The chock arm 50 is formed to be non-linear so that the chock arm 50 will extend outwardly and downwardly from the housing 30. The tire chock 60 further has a bottom surface 62 and includes a rubber pad 63 attached thereto for providing resistive force against a ground surface. The rubber pad 63 enables the bottom surface 62 to conform to the shape of the ground surface, thereby allowing the chocking system to be effective on reasonably uneven terrain.

Referring back to FIG. 3, the chocking system 10 further includes a plurality of collars 70 securable to each other and having an arcuate portion 71 formed substantially medially thereof respectively. The plurality of collars 70 are engageable about a vehicle axle for assisting to maintain same at a non-rotating position, with one such collar 70 being securable to the housing 30. The plurality of collars 70 further provide a secure and stable mounting base for the housing 30 that is bolted to the vehicle and assist in maintaining the tire chock 60 at a fixed position when engaged with a tire.

The chocking system 10 provides a number of safety and convenience advantages for users. Instead of risking a possible runaway situation and subsequent collision, the chocking system effectively immobilizes a vehicle parked on an incline. This provides piece of mind for safety conscious drivers and helps prevent vehicular damage, injuries and deaths. Advantageously, this piece of mind enables drivers to park in locations heretofore ignored by drivers out of safety concerns, rendering such property now useable, and therefore, more valuable to its owner.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A vehicle chocking system comprising:
   a control panel positionable within a vehicle and for remotely operating said chocking system;
   a housing having a slot formed therein and including a motor disposed therein and electrically connected to said control panel, said motor including a threaded shaft selectively movable between retracted and expanded positions;
   a chock arm having top and bottom end portions with said top end portion being pivotally connected to said motor, said chock arm being movable between operating and non-operating positions as said threaded shaft is expanded and retracted respectively;
   a tire chock connected to said chock arm and being engageable with a vehicle tire for preventing same from rotating in a predetermined direction;
   a plurality of collars securable to each other and having an arcuate portion formed substantially medially thereof respectively, said plurality of collars being engageable about a vehicle axle for assisting to maintain the vehicle axle at a non-rotating position, one of said plurality of collars being securable to said housing; and
   a power source for supplying power to said system;
   said chock arm further comprising an elongated pin connected thereto and extending outwardly therefrom, said tire chock having a slot formed therein and for receiving said pin so that said tire chock can be engaged and disengaged with a vehicle tire.

2. The chocking system of claim 1, wherein said tire chock further has a bottom surface and comprises a rubber pad attached thereto for providing resistive force against a ground surface.

3. The chocking system of claim 1, wherein said tire chock further comprises a serrated surface engageable with a vehicle tire and for maintaining surface contact therewith.

4. The chocking system of claim 1, wherein said tire chock has a longitudinal length extending substantially across a width of a vehicle tire.

5. The chocking system of claim 1, wherein said chock arm is formed to be non-linear so that said chock arm will extend outwardly and downwardly from said housing.

6. The chocking system of claim 1, wherein said housing has a front portion with said slot being formed thereat.

7. The chocking system of claim 1, wherein said housing has a rear portion with said slot being formed thereat.

* * * * *